US012269682B2

(12) United States Patent
Velagapudi et al.

(10) Patent No.: US 12,269,682 B2
(45) Date of Patent: Apr. 8, 2025

(54) SYSTEMS AND METHODS FOR PROVIDING ORDER FULFILLMENT USING A RECIRCULATING ROUTING SYSTEM

(71) Applicant: Berkshire Grey Operating Company, Inc., Bedford, MA (US)

(72) Inventors: Prasanna Velagapudi, Pittsburgh, PA (US); Joseph Romano, Arlington, MA (US); Christopher Geyer, Arlington, MA (US); Guoming Alex Long, Wexford, PA (US); Thomas Allen, Reading, MA (US); Christopher Buck, Stow, MA (US)

(73) Assignee: Berkshire Grey Operating Company, Inc., Bedford, MA (US)

(*) Notice: Subject to any disclaimer, the term of this patent is extended or adjusted under 35 U.S.C. 154(b) by 891 days.

(21) Appl. No.: 17/193,384

(22) Filed: Mar. 5, 2021

(65) Prior Publication Data

US 2021/0276799 A1    Sep. 9, 2021

Related U.S. Application Data

(60) Provisional application No. 62/986,414, filed on Mar. 6, 2020.

(51) Int. Cl.
*B65G 1/04* (2006.01)
*G06T 7/50* (2017.01)
(Continued)

(52) U.S. Cl.
CPC ......... *B65G 1/0485* (2013.01); *B65G 1/0407* (2013.01); *G06T 7/50* (2017.01); *G06T 7/70* (2017.01); *H04N 7/18* (2013.01)

(58) Field of Classification Search
CPC .. B65G 1/0485; B65G 1/0407; B65G 1/0435; B65G 1/1378; G06T 7/50; G06T 7/70; H04N 7/18
See application file for complete search history.

(56) References Cited

U.S. PATENT DOCUMENTS

| 3,750,804 A | 8/1973 | Lemelson |
| 3,951,276 A | 4/1976 | Moses |

(Continued)

FOREIGN PATENT DOCUMENTS

| CA | 3043018 A1 | 5/2018 |
| CA | 3057334 A1 | 9/2018 |

(Continued)

OTHER PUBLICATIONS

Annex to Form PCT/ISA/206, Communication Relating to the Results of the Partial International Search and Provisional Opinion Accompanying the Partial Search Result issued by the International Searching Authority, the European Patent Office, in related International Application No. PCT/US2021/021140 on Jul. 6, 2021, 8 pages.

(Continued)

*Primary Examiner* — Jacob S. Scott
*Assistant Examiner* — Erin Morris
(74) *Attorney, Agent, or Firm* — Gesmer Updegrove LLP

(57) ABSTRACT

A storage, retrieval and processing system is disclosed for processing objects. The storage, retrieval and processing system includes a plurality of bins including objects to be distributed, the plurality of bins being provided on a conveyance system, a programmable motion device that includes an end effector for grasping and moving any of the objects, the programmable motion device being capable of reaching any of the objects within at least one of the plurality of bins in an input area of the conveyance system, a (Continued)

perception system for providing perception data regarding a selected object that is presented to the perception system by the programmable motion device, and a routing conveyance system including a track-mounted shuttle for receiving the selected object, and for moving the selected object in each of horizontal and vertical directions toward a destination container responsive to the perception data.

20 Claims, 14 Drawing Sheets

(51) Int. Cl.
*G06T 7/70* (2017.01)
*H04N 7/18* (2006.01)

(56) References Cited

U.S. PATENT DOCUMENTS

| | | | |
|---|---|---|---|
| 4,542,808 A | 9/1985 | Lloyd, Jr. et al. |
| 4,622,875 A | 11/1986 | Emery et al. |
| 4,678,390 A | 7/1987 | Bonneton et al. |
| 4,722,653 A | 2/1988 | Williams et al. |
| 4,815,582 A | 3/1989 | Canziani |
| 4,846,335 A | 7/1989 | Hartlepp |
| 4,895,242 A | 1/1990 | Michel |
| 5,190,162 A | 3/1993 | Harlepp |
| 5,271,703 A | 12/1993 | Lindqvist et al. |
| 5,595,263 A | 1/1997 | Pignataro |
| 5,647,473 A | 7/1997 | Miller et al. |
| 5,794,789 A | 8/1998 | Payson et al. |
| 5,875,434 A | 2/1999 | Matsuoka et al. |
| 6,006,946 A | 12/1999 | Williams et al. |
| 6,076,023 A | 6/2000 | Sato |
| 6,189,702 B1 | 2/2001 | Bonnet |
| 6,208,908 B1 | 3/2001 | Boyd et al. |
| 6,246,023 B1 | 6/2001 | Kugle |
| 6,377,867 B1 | 4/2002 | Bradley et al. |
| 6,505,093 B1 | 1/2003 | Thatcher et al. |
| 6,513,641 B1 | 2/2003 | Affaticati et al. |
| 6,688,459 B1 | 2/2004 | Bonham et al. |
| 6,705,528 B2 | 3/2004 | Good et al. |
| 6,762,382 B1 | 7/2004 | Danelski |
| 7,861,844 B2 | 1/2011 | Hayduchok et al. |
| 8,718,814 B1 | 5/2014 | Clark et al. |
| 8,776,694 B2 | 7/2014 | Rosenwinkel et al. |
| 8,798,784 B1 | 8/2014 | Clark et al. |
| 8,851,272 B1 | 10/2014 | Hill |
| 9,020,632 B2 | 4/2015 | Naylor |
| 9,272,845 B2 | 3/2016 | Honkanen et al. |
| 9,364,865 B2 | 6/2016 | Kim |
| 9,481,518 B2 | 11/2016 | Neiser |
| 9,694,977 B2 | 7/2017 | Aprea et al. |
| 9,937,532 B2 | 4/2018 | Wagner et al. |
| 9,975,148 B2 | 5/2018 | Zhu et al. |
| 10,007,827 B2 | 6/2018 | Wagner et al. |
| 10,029,865 B1 | 7/2018 | McCalib, Jr. et al. |
| 10,086,998 B1 | 10/2018 | Tilekar et al. |
| 10,438,034 B2 | 10/2019 | Wagner et al. |
| 10,518,974 B2 | 12/2019 | Lee et al. |
| 10,577,180 B1 | 3/2020 | Mehta et al. |
| 10,596,696 B2 | 3/2020 | Wagner et al. |
| 10,632,610 B2 | 4/2020 | Wagner et al. |
| 10,649,445 B2 | 5/2020 | Wagner et al. |
| 10,730,077 B2 | 8/2020 | Wagner et al. |
| 10,843,333 B2 | 11/2020 | Wagner et al. |
| 10,894,674 B2 | 1/2021 | Wagner et al. |
| 10,906,740 B2 | 2/2021 | Wagner et al. |
| 11,020,770 B1 | 6/2021 | Tilekar et al. |
| 11,338,999 B2 | 5/2022 | Hu |
| 11,472,633 B2 | 10/2022 | Wagner et al. |
| 2002/0091801 A1 | 7/2002 | Lewin et al. |
| 2002/0179400 A1 | 12/2002 | Dersham et al. |
| 2002/0179502 A1 | 12/2002 | Cerutti et al. |
| 2003/0218307 A1 | 11/2003 | Anderson et al. |
| 2005/0002762 A1 | 1/2005 | Gambarelli et al. |
| 2006/0045672 A1 | 3/2006 | Maynard et al. |
| 2008/0181753 A1 | 7/2008 | Bastian et al. |
| 2009/0129902 A1 | 5/2009 | Schafer |
| 2010/0036675 A1 | 2/2010 | Schäfer |
| 2010/0096243 A1 | 4/2010 | Balk |
| 2010/0300842 A1 | 12/2010 | Bastian, II et al. |
| 2010/0316469 A1 | 12/2010 | Lert et al. |
| 2011/0056806 A1 | 3/2011 | Johnson |
| 2011/0144798 A1 | 6/2011 | Freudelsperger |
| 2011/0262253 A1 | 10/2011 | Krizmanic et al. |
| 2012/0029687 A1 | 2/2012 | Hagen et al. |
| 2012/0128454 A1 | 5/2012 | Hayduchok et al. |
| 2012/0177465 A1 | 7/2012 | Koholka |
| 2012/0328397 A1 | 12/2012 | Yamashita |
| 2013/0051696 A1 | 2/2013 | Garrett et al. |
| 2014/0031972 A1 | 1/2014 | DeWitt et al. |
| 2014/0056672 A1 | 2/2014 | Mathys et al. |
| 2014/0086714 A1 | 3/2014 | Malik |
| 2014/0142746 A1 | 5/2014 | Vegh et al. |
| 2014/0212257 A1 | 7/2014 | Yamashita |
| 2014/0244026 A1 | 8/2014 | Neiser |
| 2014/0277692 A1 | 9/2014 | Buzan et al. |
| 2014/0277693 A1 | 9/2014 | Naylor |
| 2014/0288696 A1 | 9/2014 | Lert |
| 2015/0098775 A1 | 4/2015 | Razumov |
| 2015/0294260 A1 | 10/2015 | Napoli |
| 2016/0107848 A1 | 4/2016 | Baker |
| 2016/0122135 A1* | 5/2016 | Bastian, II ............ B65G 37/00 198/347.1 |
| 2016/0221757 A1 | 8/2016 | DeWitt et al. |
| 2016/0355337 A1 | 12/2016 | Lert et al. |
| 2017/0015502 A1 | 1/2017 | Engel et al. |
| 2017/0043953 A1 | 2/2017 | Battles et al. |
| 2017/0057756 A1 | 3/2017 | Dugat et al. |
| 2017/0136632 A1 | 5/2017 | Wagner et al. |
| 2017/0173638 A1 | 6/2017 | Wagner et al. |
| 2017/0267452 A1 | 9/2017 | Goren et al. |
| 2017/0330135 A1 | 11/2017 | Taylor et al. |
| 2017/0349385 A1 | 12/2017 | Maroni et al. |
| 2018/0037410 A1 | 2/2018 | DeWitt |
| 2018/0057264 A1 | 3/2018 | Wicks et al. |
| 2018/0075402 A1 | 3/2018 | Stadie et al. |
| 2018/0085788 A1 | 3/2018 | Engel |
| 2018/0105363 A1 | 4/2018 | Lisso |
| 2018/0208397 A1 | 7/2018 | Schack et al. |
| 2018/0251302 A1 | 9/2018 | Valinsky et al. |
| 2018/0265311 A1 | 9/2018 | Wagner et al. |
| 2018/0273296 A1 | 9/2018 | Wagner et al. |
| 2018/0273298 A1 | 9/2018 | Wagner et al. |
| 2018/0282066 A1 | 10/2018 | Wagner et al. |
| 2018/0290830 A1 | 10/2018 | Valinsky et al. |
| 2018/0327198 A1 | 11/2018 | Wagner et al. |
| 2018/0354719 A1 | 12/2018 | Hoffman |
| 2019/0218033 A1 | 7/2019 | Muttathil et al. |
| 2019/0329979 A1 | 10/2019 | Wicks et al. |
| 2020/0005005 A1 | 1/2020 | Wagner et al. |
| 2020/0016746 A1 | 1/2020 | Yap et al. |
| 2020/0039745 A1 | 2/2020 | Khodl et al. |
| 2020/0152259 A1 | 5/2020 | DeWitt et al. |
| 2020/0265380 A1 | 8/2020 | Dubois et al. |
| 2020/0302390 A1 | 9/2020 | Elazary et al. |
| 2020/0407178 A1 | 12/2020 | Battles et al. |
| 2021/0039140 A1 | 2/2021 | Geyer et al. |
| 2021/0039881 A1 | 2/2021 | Zhu et al. |
| 2021/0039887 A1 | 2/2021 | Zhu et al. |
| 2021/0047117 A1 | 2/2021 | Stevens et al. |
| 2021/0047118 A1 | 2/2021 | Stevens et al. |
| 2021/0173638 A1 | 6/2021 | Jia et al. |
| 2021/0276796 A1 | 9/2021 | Long |
| 2021/0276797 A1 | 9/2021 | Berkshire |
| 2021/0276798 A1 | 9/2021 | Velagapudi et al. |
| 2021/0394807 A1 | 12/2021 | Kontuniemi et al. |
| 2022/0089387 A1 | 3/2022 | Dederichs et al. |
| 2022/0234825 A1 | 7/2022 | Krishnamoorthy et al. |
| 2022/0284393 A1 | 9/2022 | Al et al. |
| 2022/0356017 A1 | 11/2022 | Romano et al. |
| 2023/0077893 A1 | 3/2023 | Gebhardt et al. |
| 2023/0112778 A1 | 4/2023 | O'Hern et al. |

(56) References Cited

U.S. PATENT DOCUMENTS

| | | |
|---|---|---|
| 2023/0119061 A1 | 4/2023 | Halamka et al. |
| 2023/0137545 A1 | 5/2023 | Austrheim |
| 2023/0150770 A1 | 5/2023 | Sebastian |
| 2023/0219767 A1 | 7/2023 | Demir et al. |
| 2023/0249914 A1 | 8/2023 | Fosnight et al. |
| 2023/0271785 A1 | 8/2023 | Gravelle et al. |
| 2023/0331475 A1 | 10/2023 | Yamashita |

FOREIGN PATENT DOCUMENTS

| | | | |
|---|---|---|---|
| CN | 102001506 A | 4/2011 | |
| CN | 102264602 A | 11/2011 | |
| CN | 103332426 A | 10/2013 | |
| CN | 104169196 A | 11/2014 | |
| CN | 104859990 A | 8/2015 | |
| CN | 104925440 A | 9/2015 | |
| CN | 205257168 U | 5/2016 | |
| CN | 105858042 A | 8/2016 | |
| CN | 205820147 U | 12/2016 | |
| CN | 104495181 B | 2/2017 | |
| CN | 206456846 U | 9/2017 | |
| CN | 107635896 A | 1/2018 | |
| CN | 107720072 A | 2/2018 | |
| CN | 108146948 A | 6/2018 | |
| CN | 108700869 A | 10/2018 | |
| CN | 109081027 A | 12/2018 | |
| CN | 110062740 A | 7/2019 | |
| CN | 110325462 A | 10/2019 | |
| CN | 209506761 U | 10/2019 | |
| CN | 110431097 A * | 11/2019 | B65G 1/04 |
| CN | 110461734 A | 11/2019 | |
| CN | 110462657 A | 11/2019 | |
| CN | 209720654 U | 12/2019 | |
| CN | 110662707 A | 1/2020 | |
| CN | 110691742 A | 1/2020 | |
| CN | 110740954 A | 1/2020 | |
| CN | 110803439 A | 2/2020 | |
| CN | 115210152 A | 10/2022 | |
| CN | 115243987 A | 10/2022 | |
| CN | 115243988 A | 10/2022 | |
| CN | 117255718 A | 12/2023 | |
| CN | 118139798 A | 6/2024 | |
| DE | 102004014378 A1 | 10/2005 | |
| DE | 102008046325 A1 | 3/2010 | |
| EP | 1151942 A2 | 11/2001 | |
| EP | 2818433 A1 | 12/2014 | |
| EP | 3354598 A1 | 8/2018 | |
| EP | 3572355 A1 | 11/2019 | |
| EP | 4114766 A2 | 1/2023 | |
| EP | 4114767 A1 | 1/2023 | |
| EP | 4114768 A1 | 1/2023 | |
| EP | 4114769 A1 | 1/2023 | |
| EP | 4334045 A2 | 3/2024 | |
| JP | S5826703 A | 2/1983 | |
| JP | S6015302 A | 1/1985 | |
| JP | 2007131383 A | 5/2007 | |
| JP | 2003104513 A | 4/2009 | |
| JP | 2013052958 A | 3/2013 | |
| JP | 2008110779 A | 5/2015 | |
| JP | 2009035407 A | 2/2019 | |
| TW | 201300298 A | 1/2013 | |
| WO | 2007009136 A1 | 1/2007 | |
| WO | 2009089159 A2 | 7/2009 | |
| WO | 2010040809 A1 | 4/2010 | |
| WO | 2011012611 A1 | 2/2011 | |
| WO | 2012106744 A1 | 8/2012 | |
| WO | 2014080041 A1 | 5/2014 | |
| WO | 2016105201 A2 | 6/2016 | |
| WO | 2017123678 A1 | 7/2017 | |
| WO | WO-2018175466 A1 * | 9/2018 | B65G 1/04 |
| WO | 2018195196 A1 | 10/2018 | |
| WO | 2021026359 A1 | 2/2021 | |
| WO | 2021178819 A1 | 9/2021 | |
| WO | 2021178826 A1 | 9/2021 | |
| WO | 2021178830 A1 | 9/2021 | |
| WO | 2022236038 A2 | 11/2022 | |
| WO | 2023064465 A1 | 4/2023 | |

OTHER PUBLICATIONS

International Search Report and Written Opinion issued by the International Searching Authority (the European Patent Office) in related International Application No. PCT/US2021/021140 on Sep. 3, 2021, 16 pages.

Notice on the First Office Action, along with its English translation, issued by the China National Intellectual Property Administration, in related Chinese Patent Application No. 202180018364.0 on Mar. 30, 2023, 23 pages.

Notice on the First Office Action, along with its English translation, issued by the China National Intellectual Property Administration, in related Chinese Patent Application No. 202180018310.4 on Mar. 30, 2023, 21 pages.

Notice of First Office Action, along with its English translation, issued by the China National Intellectual Property Office in related Chinese Patent Application No. 202180018333.5 on Mar. 31, 2023, 32 pages.

Notice of First Office Action, along with its English translation, issued by the China National Intellectual Property Office in related Chinese Patent Application No. 202180018436.1 on Mar. 31, 2023, 17 pages.

International Search Report and Written Opinion of the International Searching Authority, the European Patent Office, issued in related International Application No. PCT/US2022/046561 on Feb. 13, 2023, 13 pages.

Annex to Form PCT/ISA/206, Communication Relating to the Results of the Partial International Search issued by the European Patent Office, as the International Searching Authority, in related International Application No. PCT/US2022/028047 on Sep. 22, 2022, 2 pages.

Communication pursuant to Rules 161(1) and 162 EPC issued by the European Patent Office in related European Patent Application No. 21714592.9 on Oct. 13, 2022, 3 pages.

Communication pursuant to Rules 161(1) and 162 EPC issued by the European Patent Office in related European Patent Application No. 21714588.7 on Oct. 13, 2022, 3 pages.

Communication pursuant to Rules 161(1) and 162 EPC issued by the European Patent Office in related European Patent Application No. 21714590.3 on Oct. 13, 2022, 3 pages.

Communication pursuant to Rules 161(1) and 162 EPC issued by the European Patent Office in related European Patent Application No. 21715372.5 on Oct. 13, 2022, 3 pages.

International Search Report and the Written Opinion of the International Searching Authority, or the Declaration, and the International Search Report and Written Opinion of the International Searching Authority (the European Patent Office) issued in related International Application No. PCT/US2022/028047 on Nov. 14, 2022, 20 pages.

Non-Final Office Action issued by the United States Patent and Trademark Office in related U.S. Appl. No. 17/193,378 on Aug. 4, 2023, 26 pages.

Notice on the Second Office Action, along with its English translation, issued by the China National Intellectual Property Administration in related Chinese Patent Application No. 202180018310.4 on Oct. 11, 2023, 24 pages.

Notice on the Second Office Action, along with its English translation, issued by the China National Intellectual Property Administration in related Chinese Patent Application No. 202180018333.5 on Oct. 12, 2023, 35 pages.

Notice on the Second Office Action, along with its English translation, issued by the China National Intellectual Property Administration in related Chinese Patent Application No. 202180018364.0 on Oct. 11, 2023, 19 pages.

International Preliminary Report on Patentability issued by the International Bureau of WIPO in related International application No. PCT/US2022/028047 on Oct. 24, 2023, 14 pages.

(56) References Cited

OTHER PUBLICATIONS

International Preliminary Report on Patentability issued by the International Bureau of WIPO in related International Application No. PCT/US2021/021118 on Sep. 6, 2022, 9 pages.
International Preliminary Report on Patentability issued by the International Bureau of WIPO in related International Application No. PCT/US2021/021133 on Sep. 6, 2022, 7 pages.
International Preliminary Report on Patentability issued by the International Bureau of WIPO in related International Application No. PCT/US2021/021140 on Sep. 15, 2022, 10 pages.
International Preliminary Report on Patentability issued by the International Bureau of WIPO in related International Application No. PCT/US2021/021128 on Sep. 6, 2022, 8 pages.
International Search Report and Written Opinion of the International Searching Authority issued by the European Patent Office in related International Application No. PCT/US2021/021133 on Jun. 21, 2021, 11 pages.
International Search Report and Written Opinion issued by the International Searching Authority (the European Patent Office) in related International Application No. PCT/US2021/021128 on Jun. 21, 2021, 12 pages.
International Search Report and Written Opinion of the International Searching Authority, the European Patent Office, issued in related International Application No. PCT/US2021/021118 on Jul. 16, 2021, 12 pages.
Chinese Thesis of Zhang et al., Warehouse Management Practices, Aviation Industry Press, Jan. 2012, pp. 56-59, 15 pages including the English translation prepared by Shanghai Patent & Trademark Law Office, LLC.
Communication pursuant to Rules 161(1) and 162 EPC issued by the European Patent Office in related European Patent Application No. 22727547.6 on Dec. 14, 2023, 3 pages.
Communication pursuant to Rules 161(1) and 162 EPC issued by the European Patent Office in related European Patent Application No. 22809552.7 on May 22, 2024, 3 pages.
Examiner's Report issued by the Innovation, Science and Economic Development Canada (Canadian Intellectual Property Office) in related Canadian Patent Application No. 3,174,546 on Nov. 6, 2023, 4 pages.
Examiner's Report issued by the Innovation, Science and Economic Development Canada (Canadian Intellectual Property Office) in related Canadian Patent Application No. 3,174,546 on Nov. 7, 2023, 4 pages.
Examiner's Report issued by the Innovation, Science and Economic Development Canada (Canadian Intellectual Property Office) in related Canadian Patent Application No. 3,174,543 on Nov. 6, 2023, 4 pages.
Examiner's Report issued by the Innovation, Science and Economic Development Canada (Canadian Intellectual Property Office) in related Canadian Patent Application No. 3,174,552 on Nov. 29, 2023, 6 pages.
International Preliminary Report on Patentability issued by the International Bureau of WIPO in related international application No. PCT/US2022/046561 on Apr. 16, 2024, 7 pages.
Non-Final Office Action issued by the United States Patent and Trademark Office in related U.S. Appl. No. 17/193,377 on Mar. 21, 2024, 44 pages.
Non-Final Office Action issued by the United States Patent and Trademark Office in related U.S. Appl. No. 17/193,380 on Mar. 27, 2024, 40 pages.
Notice of Third Office Action, along with its English translation, issued by the China National Intellectual Property Administration in related Chinese Patent Application No. 202180018310.4 on Apr. 17, 22 pages.
Notice of Third Office Action, along with its English translation, issued by the China National Intellectual Property Administration in related Chinese Patent Application No. 202180018333.5 on Apr. 17, 31 pages.
Notice of Third Office Action, along with its English translation, issued by the China National Intellectual Property Administration in related Chinese Patent Application No. 202180018364.0 on Apr. 17, 2024, 24 pages.
Decision on Rejection, along with its English translation, issued by the China National Intellectual Property Administration in related Chinese Patent Application No. 202180018310.4 on Sep. 13, 2024, 33 pages.
Chapter 5 High-bay Warehouses and equipment thereof of Modern Machinery and Equipment Design Manual, vol. 3, Non-Standard Machinery and Equipment Design, edited by Fan Zuyao, pp. 16-261, China Machine Press, Oct. 1996, 7 pages.
Final Office Action issued by the United States Patent and Trademark Office in related U.S. Appl. No. 17/193,377 on Oct. 16, 2024, 27 pages.
Non-Final Office Action issued by the United States Patent and Trademark Office in related U.S. Appl. No. 17/965,420 on Nov. 18, 2024, 11 pages.
International Search Report and Written Opinion of the International Searching Authority issued by the European Patent Office, as the International Searching Authority, in related International application No. PCT/US2024/052472 on Jan. 22, 2025, 14 pages.

* cited by examiner

SYSTEMS AND METHODS FOR PROVIDING ORDER FULFILLMENT USING A RECIRCULATING ROUTING SYSTEM

PRIORITY

The present application claims priority to U.S. Provisional Patent Application No. 62/986,414 filed Mar. 6, 2020, the disclosure of which is hereby incorporated by reference in its entirety.

BACKGROUND

The present invention relates to order fulfillment systems, and relates in particular to systems for providing aggregation of objects (e.g., products, packages, bags, items, goods etc.) for preparation for shipment to destination locations, such as in Automated Storage and Retrieval Systems.

Order fulfillment systems typically involve the processing of a wide variety of objects for distribution to a large number of distribution locations, such as intermediate distribution stations, mail order stations, geographic group locations and address specific locations. Automated storage and retrieval systems (AS/RS) generally include computer-controlled systems of automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects.

SUMMARY

In accordance with an aspect, the invention provides a storage, retrieval and processing system for processing objects. The storage, retrieval and processing system includes a plurality of bins including objects to be distributed, the plurality of bins being provided on a conveyance system, a programmable motion device that includes an end effector for grasping and moving any of the objects, the programmable motion device being capable of reaching any of the objects within at least one of the plurality of bins in an input area of the conveyance system, an object perception unit for providing perception data regarding a selected object that is presented to the object perception unit by the programmable motion device, and a routing conveyance system including a track-mounted shuttle for receiving the selected object, and for moving the selected object in each of horizontal and vertical directions toward a destination container responsive to the perception data.

In accordance with another aspect, the invention provides a storage, retrieval and processing system for processing objects that includes a plurality of bins including objects to be distributed, the plurality of bins being provided on an input conveyance system, a programmable motion device that includes an end effector for grasping and moving any of the objects, a routing conveyance system including a routing track-mounted shuttle for receiving the selected object, and for moving the selected object toward a first side of any of a plurality of destination containers, and a destination container removal system for removing completed destination containers, the destination container removal system including a container conveyance system including a removal track-mounted shuttle for acquiring a completed destination container of the plurality of destination containers from a second side of the completed destination container, the second side being opposite the first side of the completed destination container.

In accordance with a further embodiment, the invention provides a method of providing storage, retrieval and processing of objects that includes providing on a conveyance system a plurality of bins including objects to be distributed, grasping and moving objects within at least one of the plurality of bins in an input area of the conveyance system using a programmable motion device that includes an end effector for grasping and moving any of the objects, the programmable motion device being capable of reaching any of the objects within at least one of the plurality of bins in an input area of the conveyance system, providing perception data regarding a selected object that is presented to the object perception unit by the programmable motion device, and routing the selected object in each of horizontal and vertical directions on a track mounted shuttle as the track-mounted shuttle moves about a circuit toward a destination container responsive to the perception data.

BRIEF DESCRIPTION OF THE DRAWINGS

The following description may be further understood with reference to the accompanying drawings in which.

The drawings are shown for illustrative purposes only.

DETAILED DESCRIPTION

Figure 2:
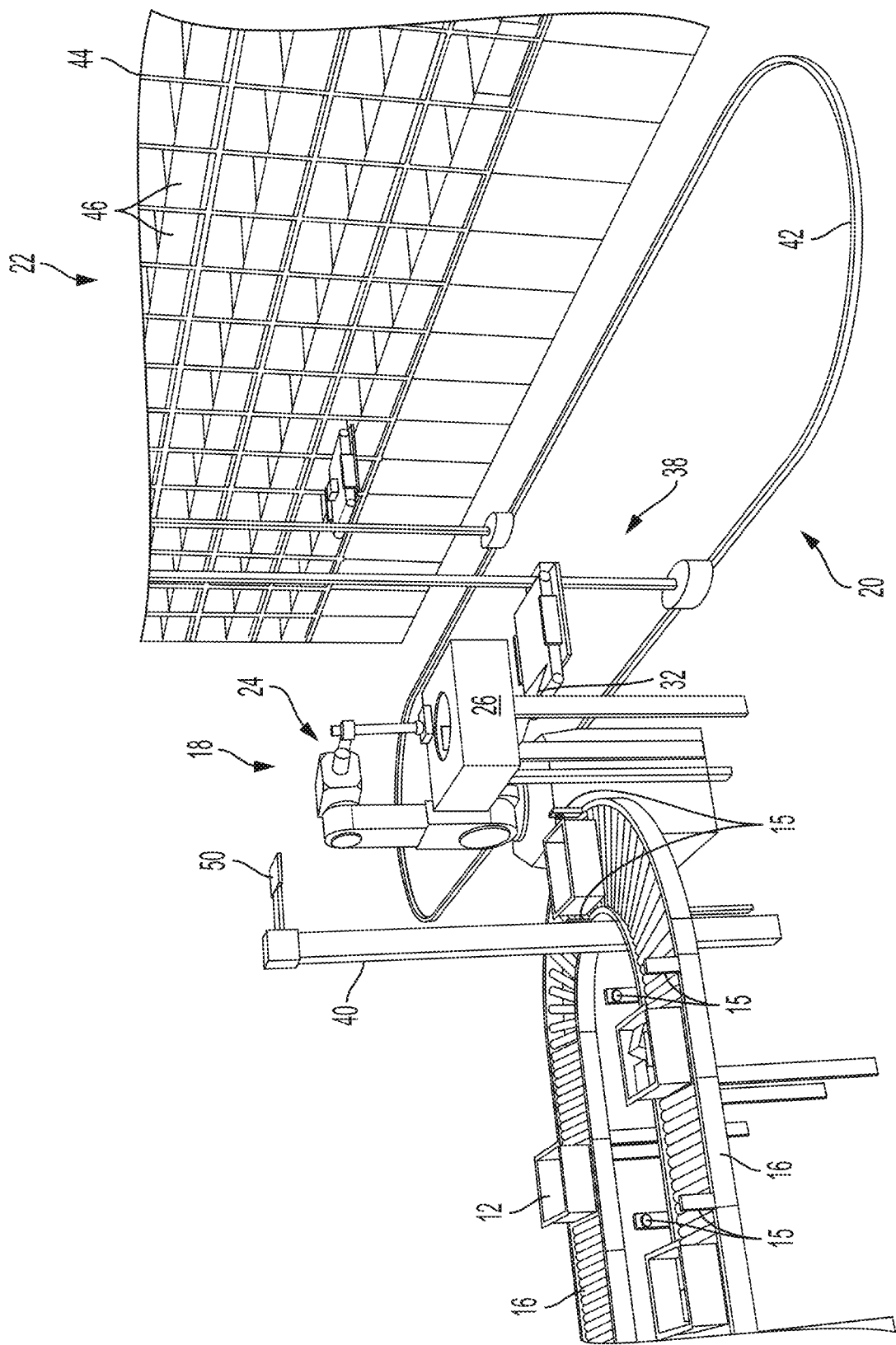
FIG. 2 shows an illustrative diagrammatic enlarged view of an intake portion of the system of FIG. 1.

In accordance with an aspect, the invention provides an ASRS system 10 in which objects are provided in a plurality of bins 12 at an input area 14 of an input conveyance system 16. Objects are processed at a processing station 18, then routed via a routing conveyance system 20 to any of a plurality of destination containers at a destination area 22. The processing station 18 may include a programmable motion device 24, a bin perception unit 50 and an object perception unit 26. Generally, objects are provided to the input area 14 in bins 12, are moved by a programmable motion device 24 to an object perception unit 26, fall to an object conveyance shuttle unit 38 of an object routing system for routing to any of a plurality of destination containers 46 in container array 44. Empty containers are provided to the container array 44, and completed containers are removed from the container array, by a container movement system adjacent an output conveyor 48. With reference to FIG. 2, the input conveyor 16 may include a plurality of detectors 15 that monitor movement of the conveyors, and may confirm the identity and positon of a conveyor at the input area 14 for processing at the processing station 18.

Figure 1:
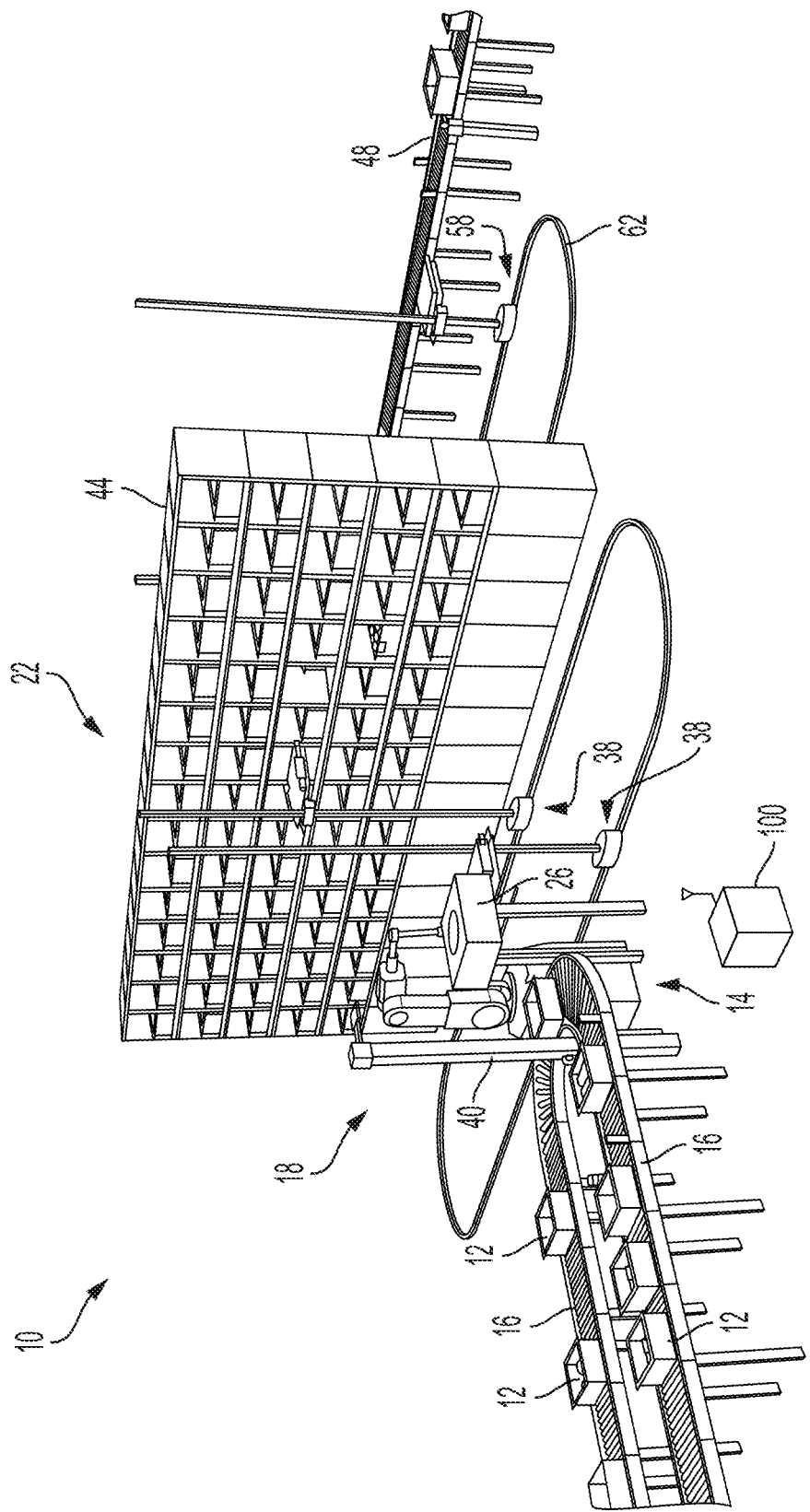
FIG. 1 shows an illustrative diagrammatic front isometric view of a storage, retrieval and processing system in accordance with an aspect of the present invention.

The operations of the system are coordinated with a central control system 100 as shown in FIG. 1 that communicates wirelessly with each of the conveyors and conveyor sensors, the programmable motion device 24, the detectors 15, the perception units 26 and 50, as well as all elements of the routing conveyance system, container arrays, container movement systems, and output conveyance systems (all components and systems). The bin perception unit 50 aids in grasping objects from the bins 12 with an end effector of the programmable motion device. Once grasped by the programmable motion device, the object is dropped into the object perception unit 26, and the system thereby determines from symbol strings the UPC associated with the object, as well as the outbound destination for each object. The central control system 100 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

Figure 3:
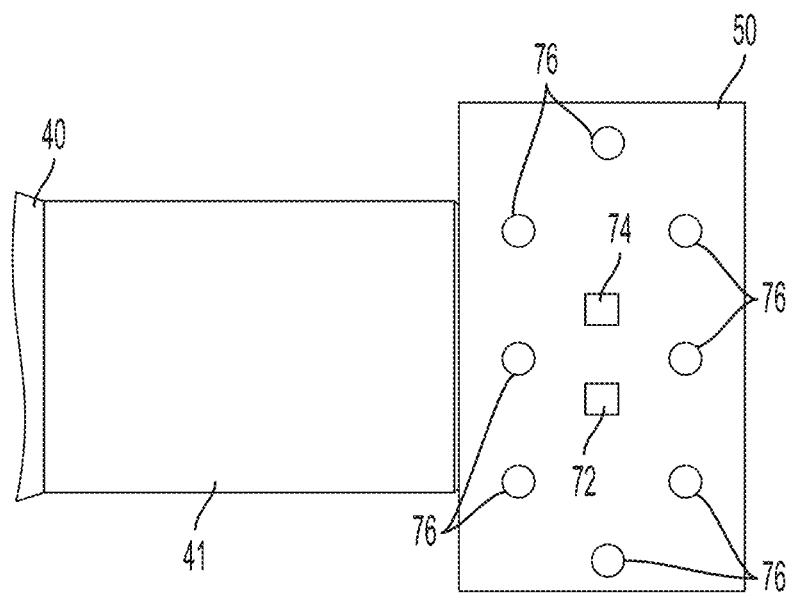
FIG. 3 shows an illustrative diagrammatic underside view of the bin perception unit of FIGS. 1 and 2.

In particular, the system of an aspect includes a bin perception unit 50 that is mounted above a bin of objects to be processed next to the articulated arm 24, looking down into a bin 12. The system 50, for example and as shown in FIG. 3, may be attached via a mount 41 to a bin perception unit stand 40, and may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 4:
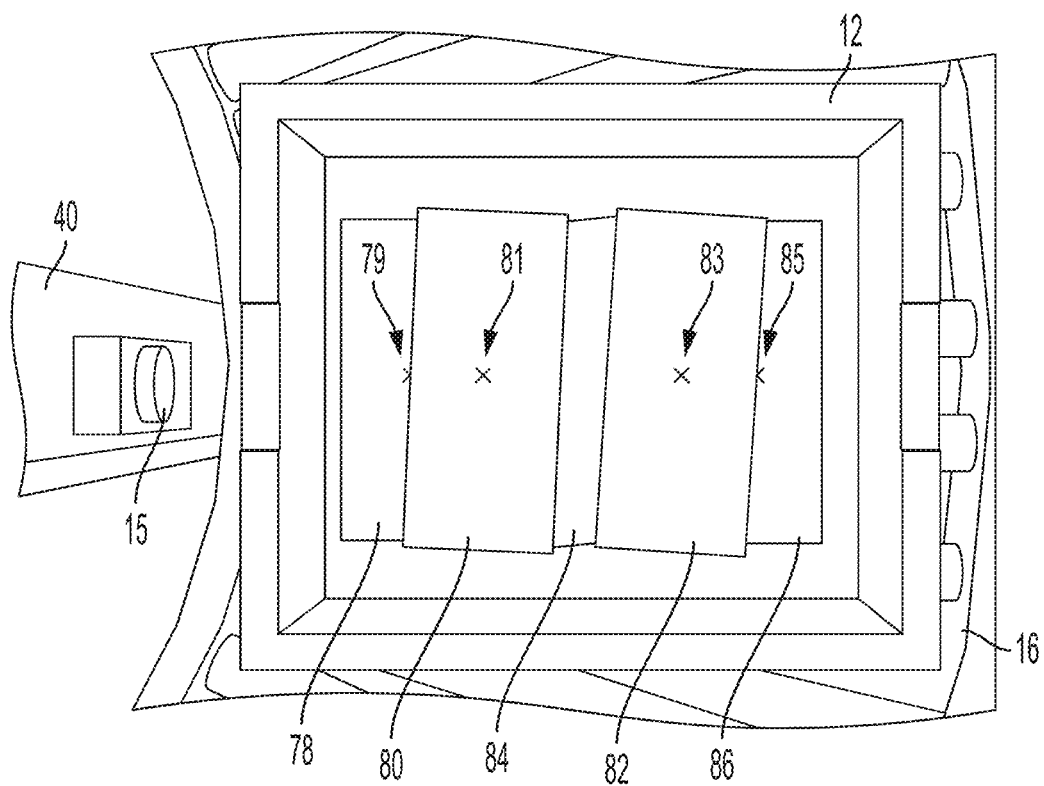
FIG. 4 shows an illustrative diagrammatic view from the bin perception unit of FIG. 3 directed a bin and its contents.

FIG. 4 shows an image view from the bin perception unit 50. The image view shows a bin 12 in the input area 14 (a conveyor), and the bin 12 contains objects 78, 80, 82, 84 and 86. In the present embodiment, the objects are homogenous, and are intended for distribution to different break-pack packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp locations 79, 85 do not because each associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams etc. where a good vacuum seal might not be available.

Figure 5:
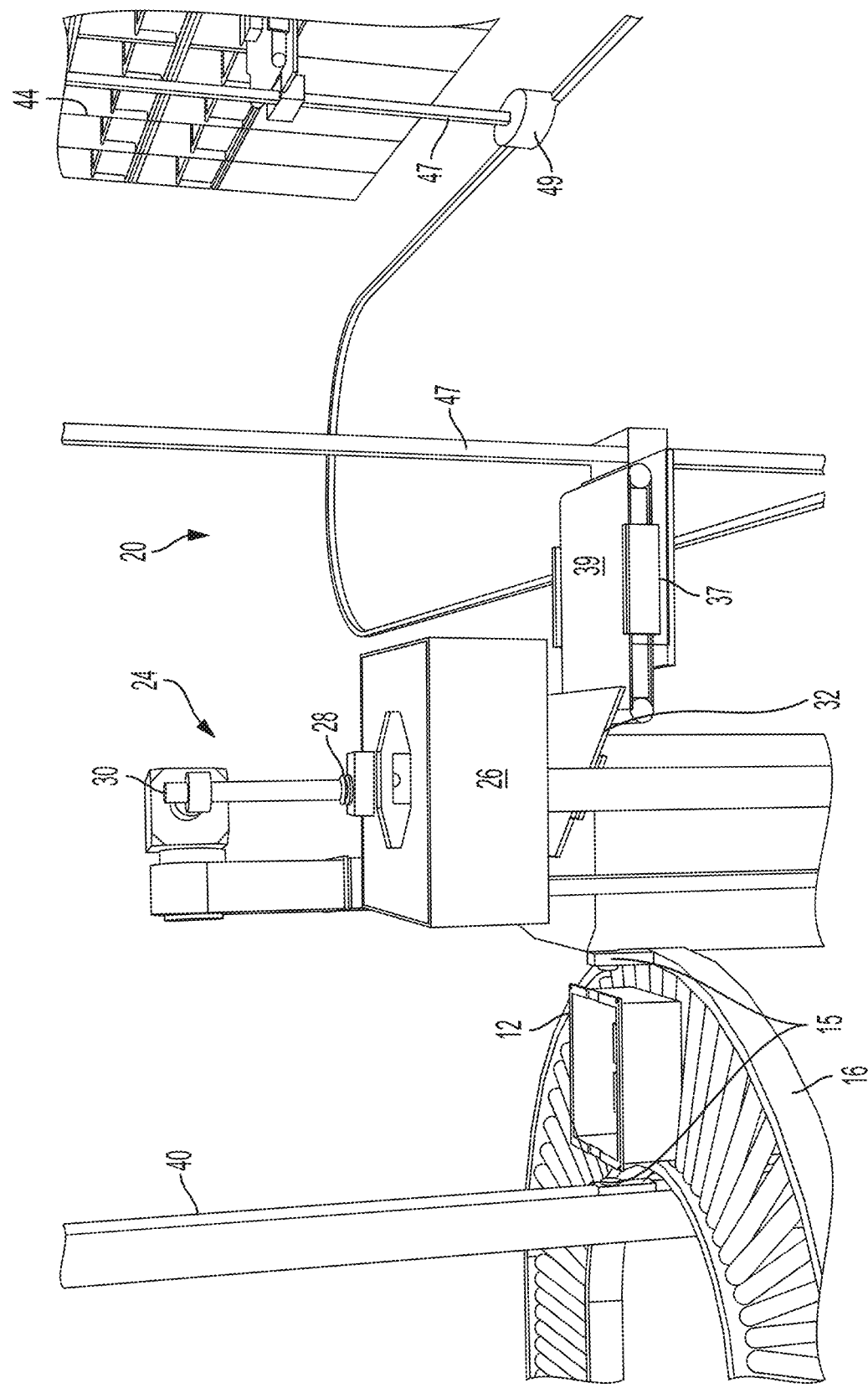
FIG. 5 shows an illustrative diagrammatic enlarged view of the object perception unit of the system of FIG. 1.
Figure 6:
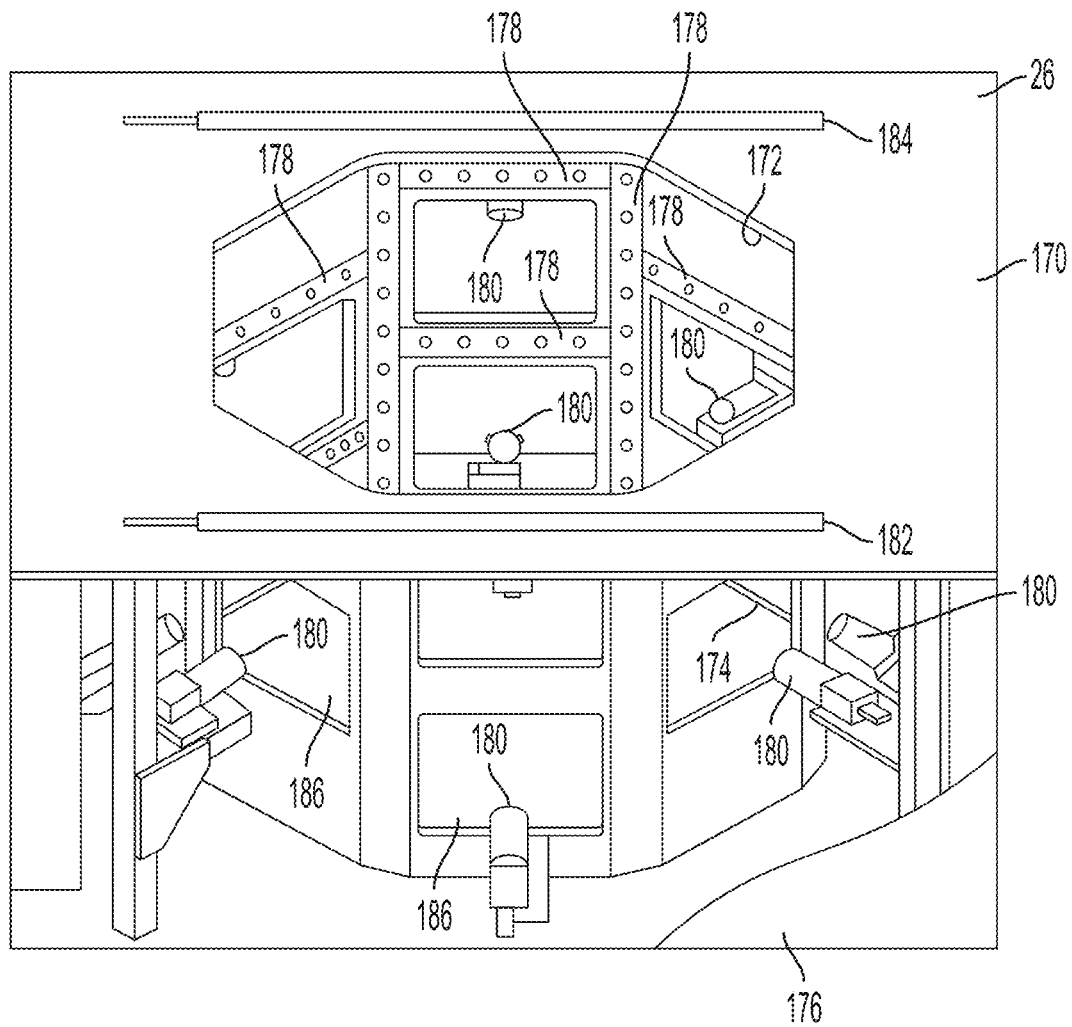
FIG. 6 shows an illustrative diagrammatic front elevated view of the object perception unit of FIGS. 1 and 5.
Figure 7:
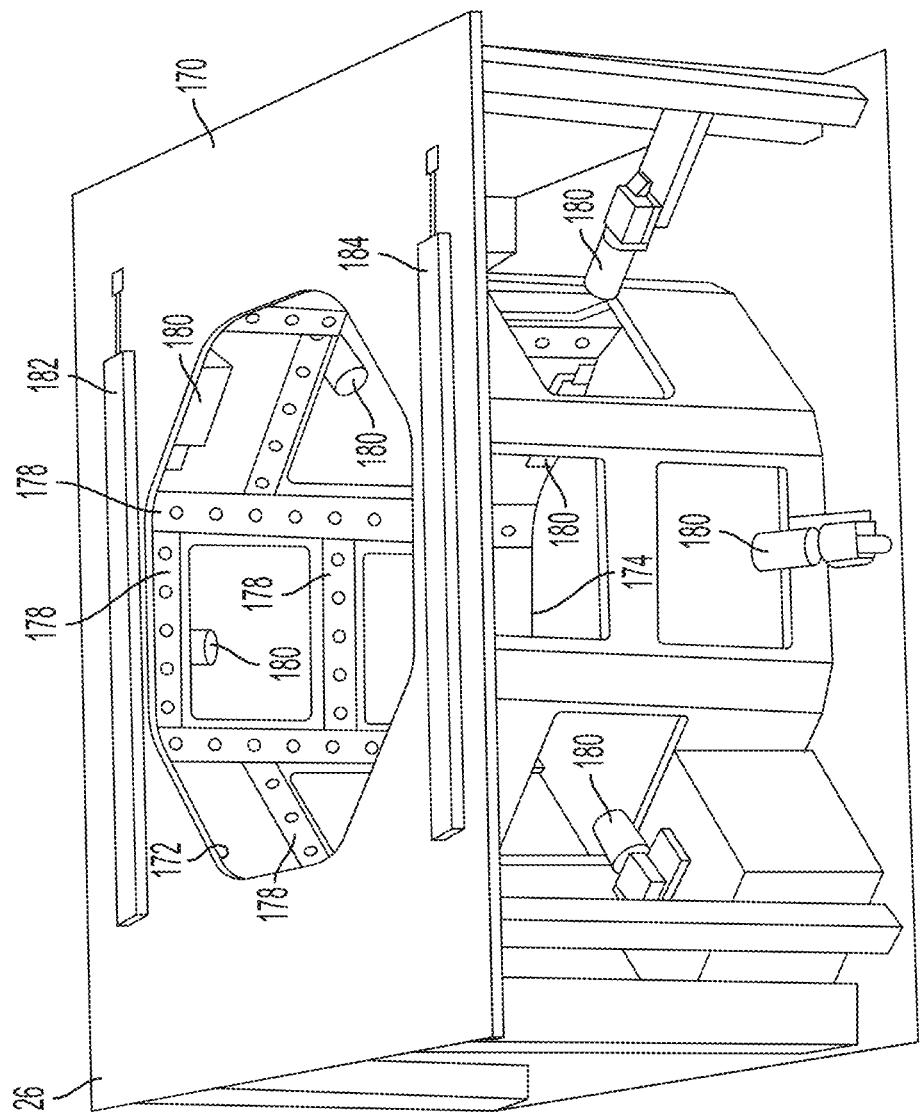
FIG. 7 shows an illustrative diagrammatic rear elevated view of the object perception unit of FIGS. 1 and 5.

With reference to FIG. 5, the programmable motion device 24 includes an end effector 28 that is coupled via a hose mount 30 to a vacuum hose attached to a vacuum source. With further reference to FIGS. 6 and 7, the object perception unit 26 includes a structure 170 having a top opening 172 and a bottom opening 174, and the walls may be covered by an enclosing material 176 (e.g., a colored covering such as orange plastic, to protect humans from potentially dangerously bright lights within the object perception unit 26) as shown in FIGS. 5 and 6. The structure 170 includes a plurality of rows of sources (e.g., illumination sources such as LEDs) 178 as well as a plurality of image capturing units (e.g., cameras) 180. The sources 178 are provided in rows, and each is directed toward the center of the opening. The cameras 180 are also generally directed toward the opening, although some cameras are directed horizontally, while others are directed upward, and some are directed downward. The system also includes an entry source (e.g., infrared source) 182 as well as an entry detector (e.g., infrared detector) 184 for detecting when an object has entered the object perception unit 26. The LEDs and cameras therefore encircle the inside of the structure 170, and the cameras are positioned to view the interior via windows that may include a glass or plastic covering (e.g., 186).

An important aspect of systems of certain embodiments of the present invention, is the ability to identify via barcode or other visual markings of objects, unique indicia associated with the object by employing an object perception unit into which objects may be dropped. Automated scanning systems would be unable to see barcodes on objects that are presented in a way that their barcodes are not exposed or visible. The object perception unit may be used in certain embodiments, with a robotic system that may include a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic system. Their size, weight and geometry are assumed to be such that the robotic system is able to pick, move and place them. These may be any kind of ordered goods, packages, parcels, or other articles that benefit from automated sorting. Each object is associated with unique indicia such as a unique code (e.g., barcode) or a unique destination (e.g., address) of the object.

The manner in which inbound objects arrive may be for example, in one of two configurations: (a) inbound objects arrive piled in bins of heterogeneous objects; or (b) inbound articles arrive by a moving conveyor. The collection of objects includes some that have exposed bar codes and other objects that do not have exposed bar codes. The robotic system is assumed to be able to pick items from the bin or conveyor. The stream of inbound objects is the sequence of objects as they are unloaded either from the bin or the conveyor. With reference to FIG. 5, after an object has been dropped through the object perception unit 26, it is guided by a guide chute 32 onto the routing conveyance system 20.

The manner in which outbound objects are organized is such that objects are placed in a bin, shelf location or container, into which all objects corresponding to a given order are consolidated. These outbound destinations may be arranged in vertical arrays, horizontal arrays, grids, or some other regular or irregular manner, but which arrangement is known to the system. The robotic pick and place system is assumed to be able to place objects into all of the outbound destinations, and the correct outbound destination is determined from unique identifying indicia (identify or destination, such as a bar code or a unique address), which identifies the object or is destination.

It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers. The symbol string uniquely associates the object with unique identifying indicia (identity or destination).

The operations of the systems described herein are coordinated by the central control system 100 as shown in FIG. 1. This system determines from symbol strings the unique indicia associated with an object, as well as the outbound destination for the object. The central control system is comprised of one or more workstations or central processing units (CPUs). The correspondence between unique identifying indicia and outbound destinations is maintained by the central control system in a database called a manifest. The central control system maintains the manifest by communicating with a warehouse management system (WMS).

Figure 8A:
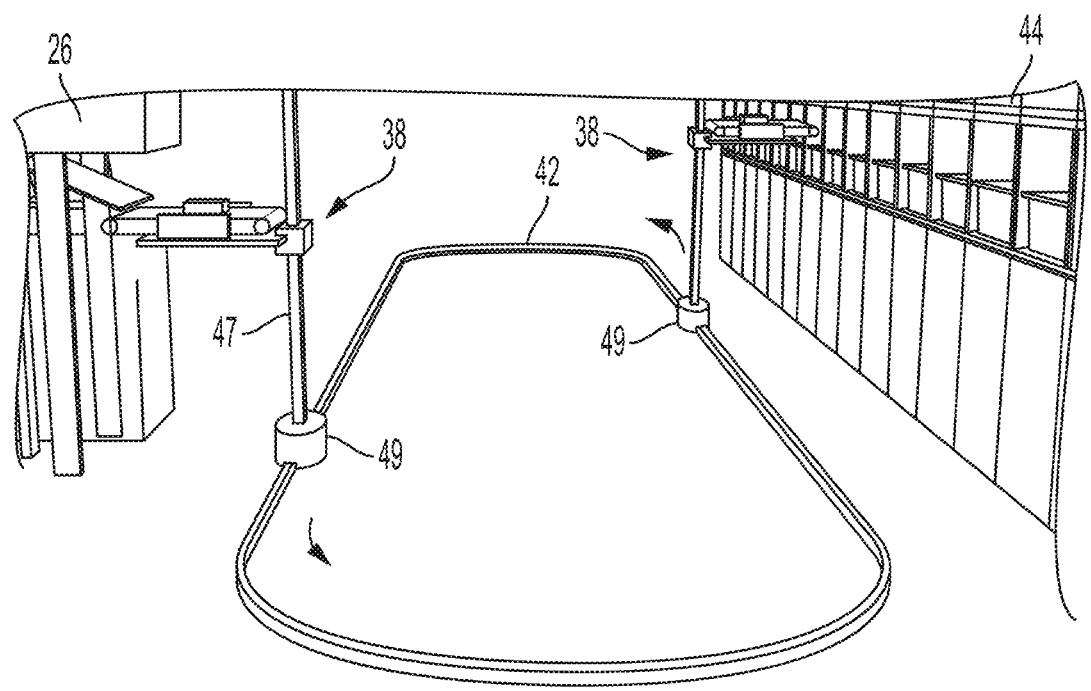
FIGS. 8A and 8B show illustrative diagrammatic views of a routing conveyor system in the processing system of FIG. 1, showing an object being loaded (FIG. 8A) and brought to a destination container (FIG. 8B)
Figure 8B:
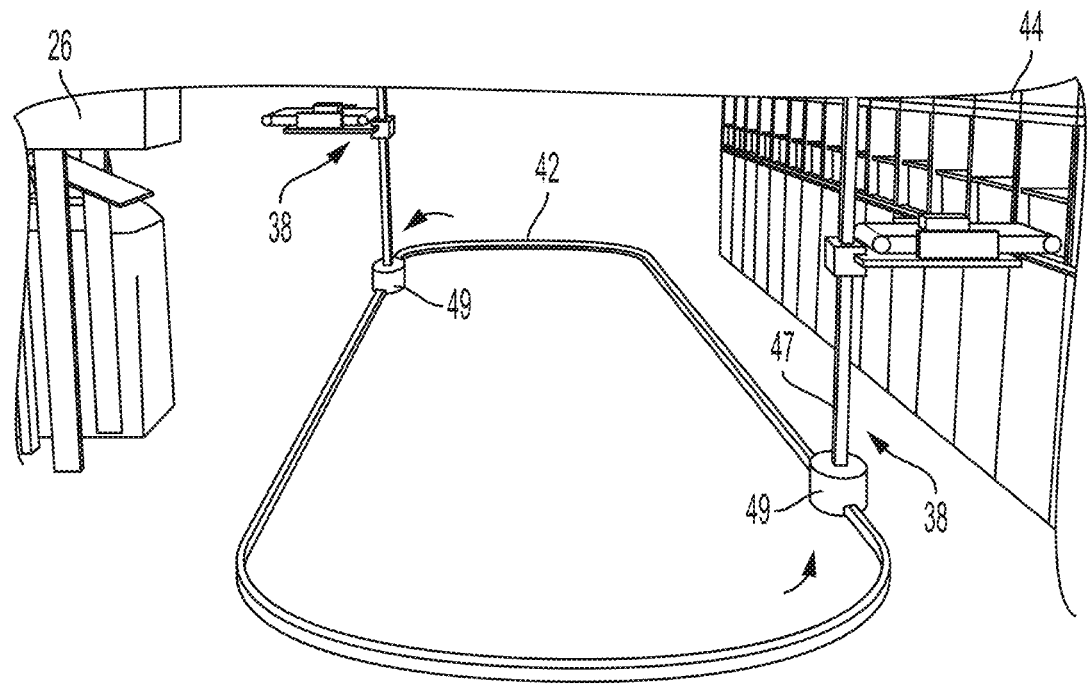
Figure 9A:
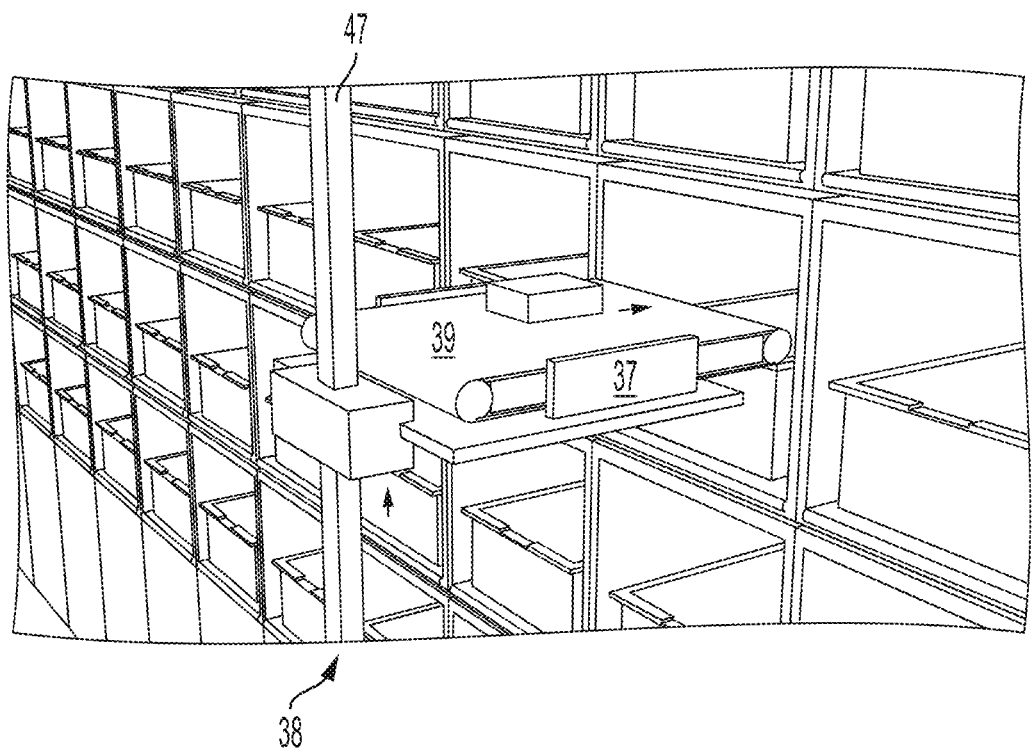
FIGS. 9A and 9B show illustrative diagrammatic views of an object being moved from a routing conveyor system (FIG. 9A) into a destination container (FIG. 9B)
Figure 9B:
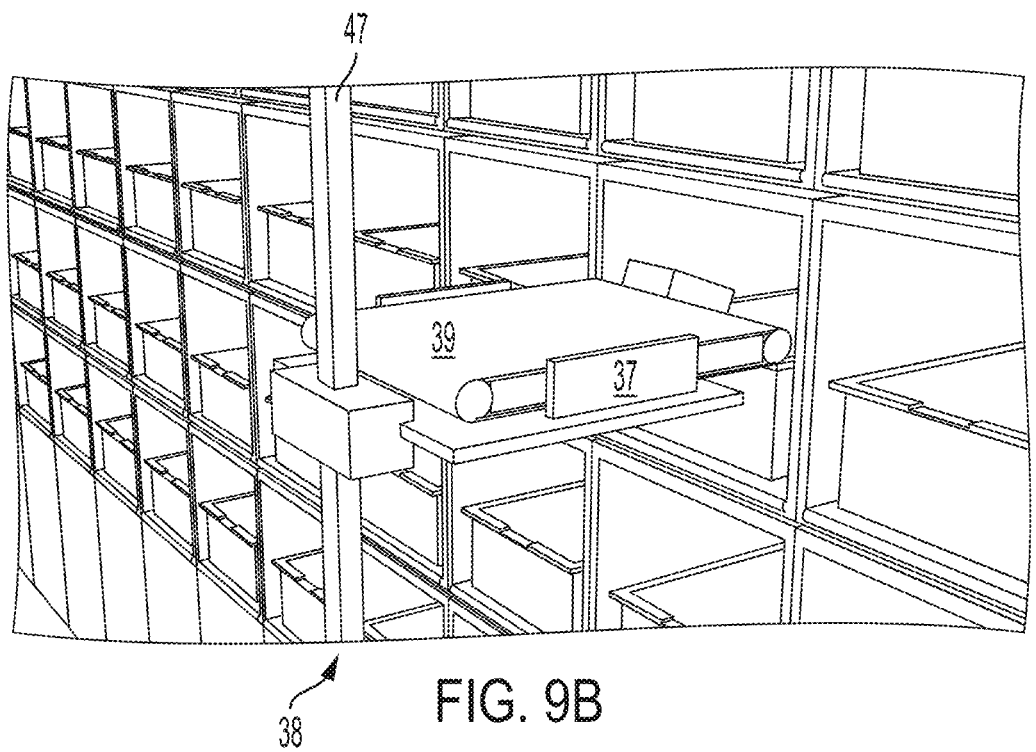

With reference to FIGS. 8A and 8B, the object conveyance shuttle unit 38 of the routing conveyance system receives objects (e.g., a singulated stream of objects) from the object feed system including the object perception unit 26. The routing conveyance system includes the object conveyance shuttle units 38 that run in a circuit along a track 42 proximate the array 44 of the plurality of destination containers. Each unit 38 includes a conveyor 39 mounted on a frame 37, and the frame 37 is vertically movable mounted on an elevator rod 47 that extends upward from a shuttle base 49 that is adapted to travel along the track 42. After an object is loaded onto a conveyor 39 of a unit 38 (as shown in FIG. 8A), the unit 38 is moved toward the array 44 of the plurality of destination containers (FIG. 8B). Once the conveyance shuttle unit is positioned along the track 42 and vertically adjacent the destination location (FIG. 9A), the conveyor 39 is actuated to move the object into the selected destination container (FIG. 9B).

Figure 10A:
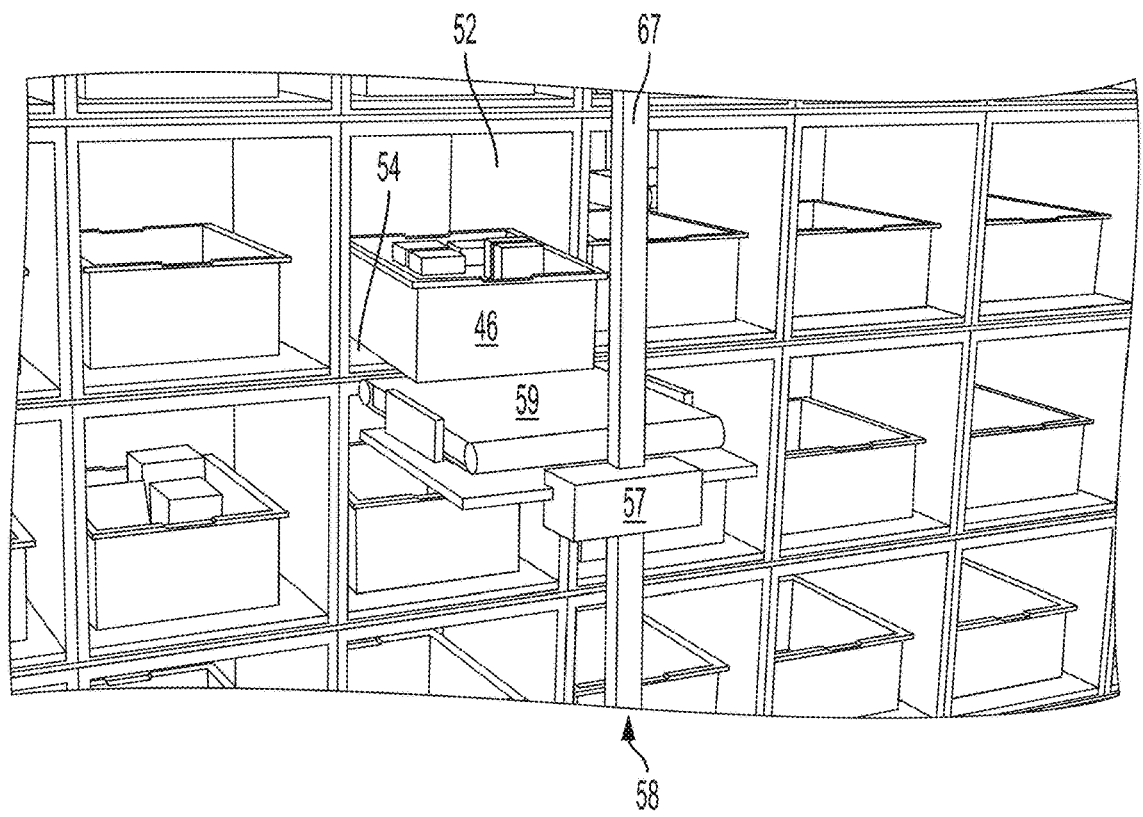
FIGS. 10A and 10B show illustrative diagrammatic views of a container movement system retrieving a completed destination container (FIG. 10A) and subsequently moving toward an output conveyor (FIG. 10B)
Figure 10B:
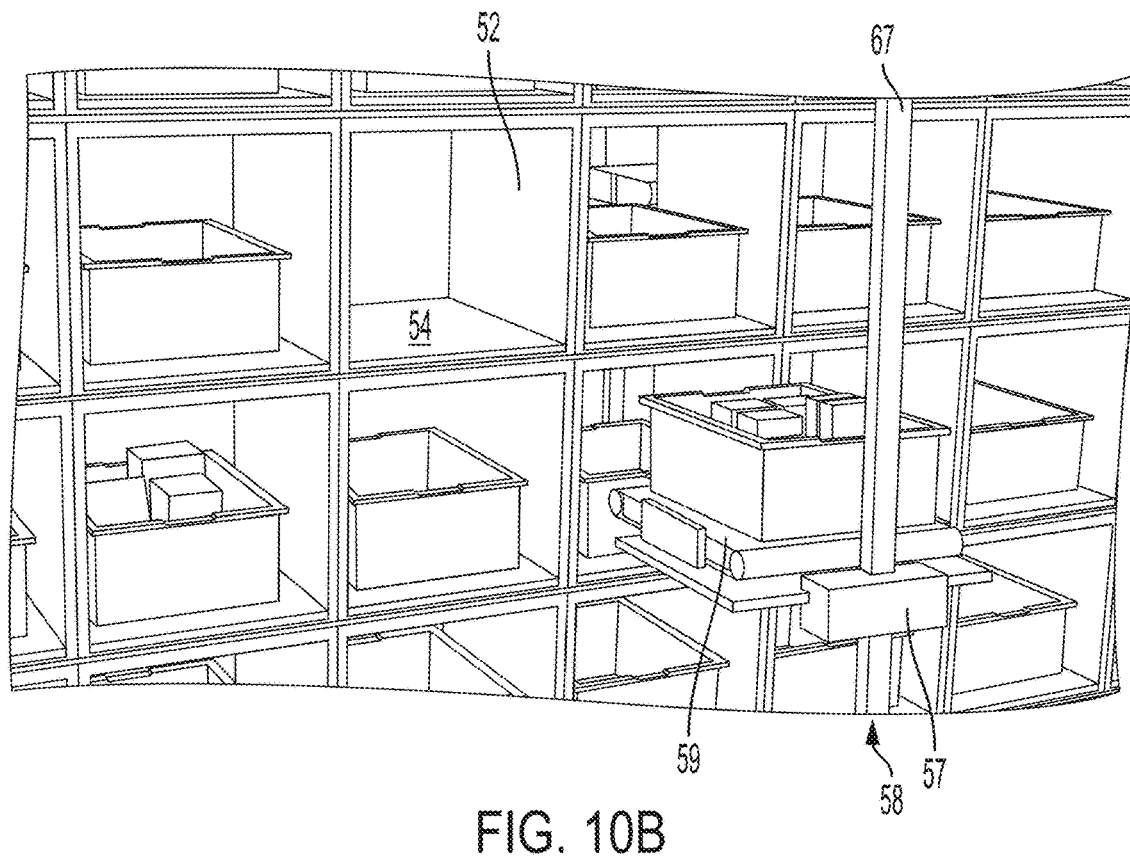
Figure 11A:
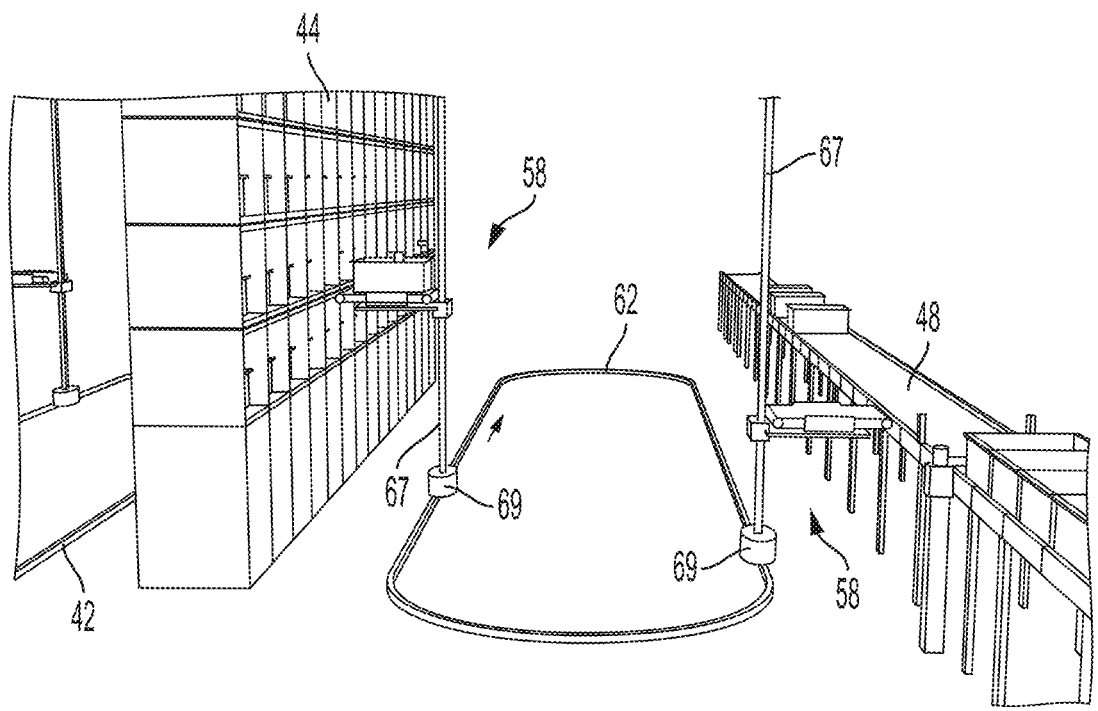
FIGS. 11A and 11B show illustrative diagrammatic views of the container movement system of FIGS. 10A and 10B moving the completed destination container away from the plurality of destination containers (FIG. 11A) toward the output conveyor (FIG. 11B)
Figure 11B:
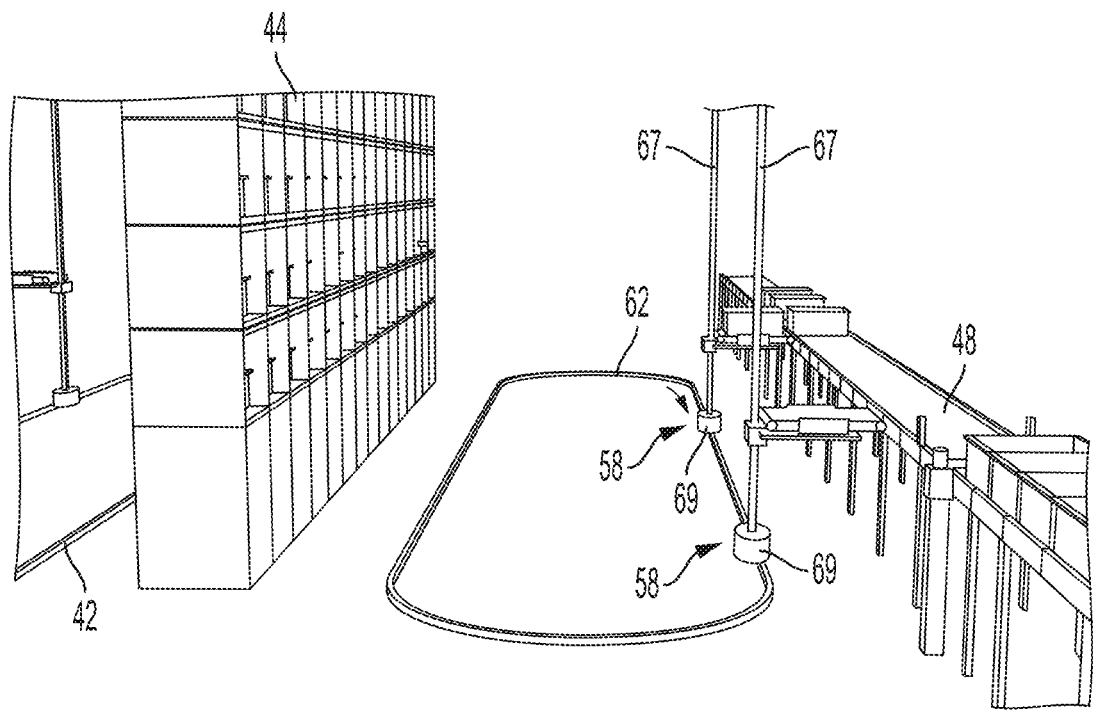
Figure 12A:
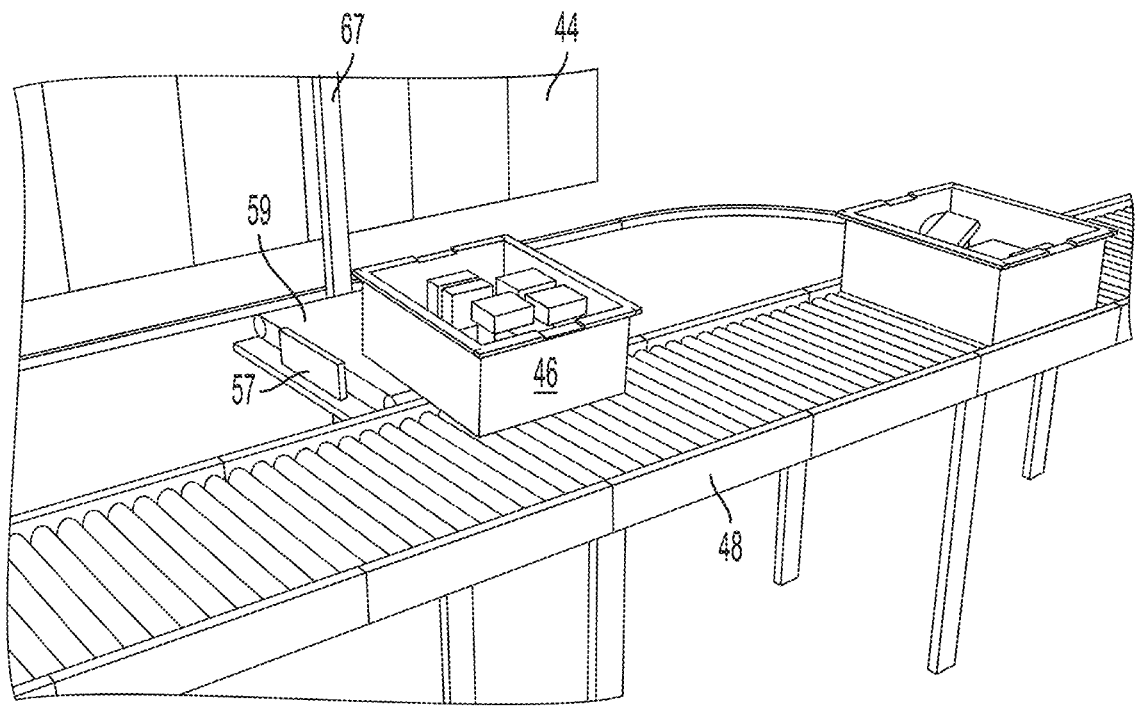
FIGS. 12A and 12B show illustrative diagrammatic views of the completed destination container of FIGS. 11A and 11B being moved onto the output conveyor (FIG. 12A) and subsequently along the output conveyor (FIG. 12B)
Figure 12B:
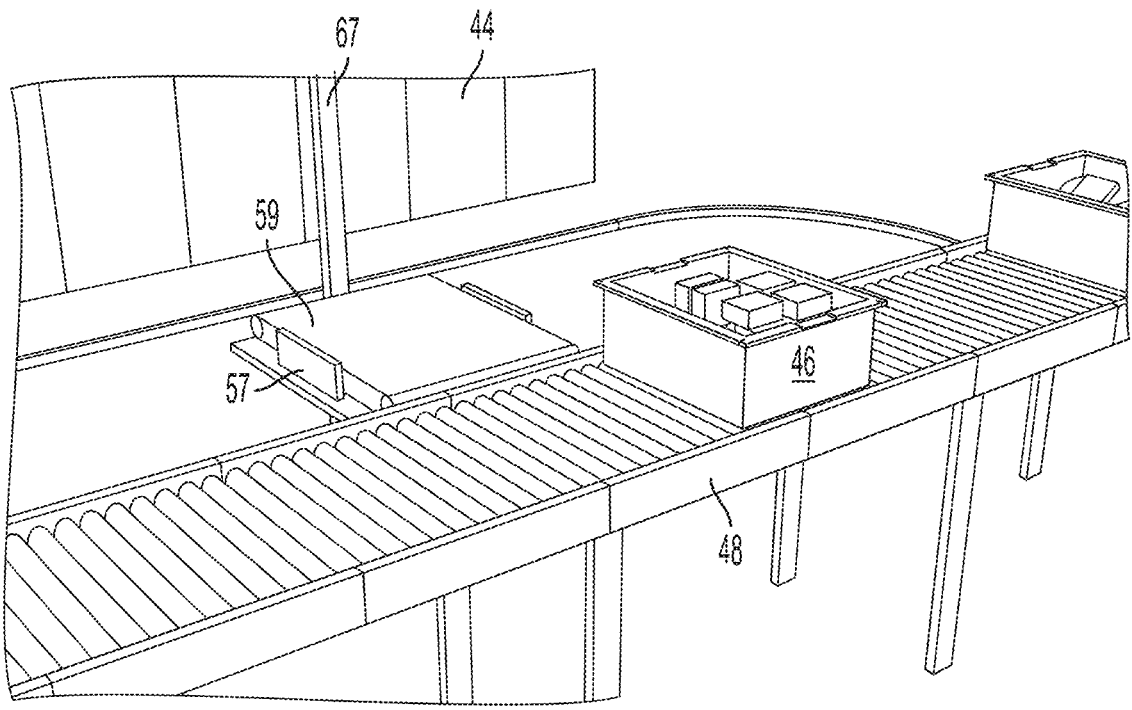

The opposite side of each of the destination containers 46 in the array 44 from which the objects are loaded into the destination containers may also be open, and may be accessed by a container movement system. FIGS. 10A and 10B shows a container movement system 58 that includes a container conveyor 59 on a structure 57 that is mounted for vertical movement along an elevator rod 67 (that is mounted at a lower end thereof to a shuttle base 69 shown in FIGS. 11A and 11B). With reference to FIG. 10A, each destination container location 52 includes an associated location container conveyor 54, and the conveyor 54 moves a completed destination container 46 toward a container conveyor 59 (FIG. 10A) on a container movement system, which then moves the completed container (FIG. 10B) toward an output conveyor 48 as shown in FIGS. 11A and 11B. With reference to FIGS. 12A and 12B, the completed destination container 46 is then moved using the container conveyor 59 from the container movement system 58 onto the output conveyor 48 (as shown in FIG. 12A), which brings the completed destination container (FIG. 12B) to an output processing location. Each of the objects is therefore moved vertically and horizontally by a routing conveyor unit, and then moved in a third direction by the container conveyor wherein the third direction is generally orthogonal to the first and second directions. The container may later be removed from the open storage location also along the third direction when completed as discussed in more detail below, and then moved horizontally and vertically for removal to an output conveyor. The movement of objects into destination containers at a first side of the destination containers, and having the completed destination containers removed from an opposite second side, permits the object conveyance system to continue to operate while destination containers are being replenished.

Figure 13A:
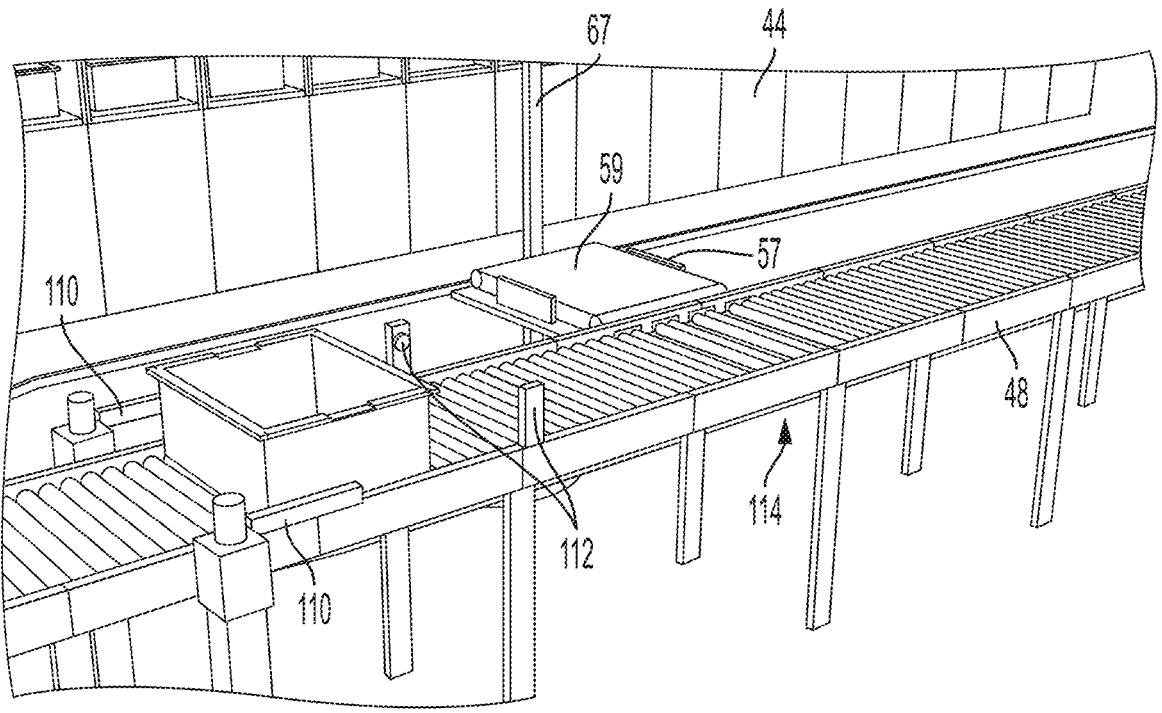
FIGS. 13A and 13B show illustrative diagrammatic views of an empty destination container being moved toward (FIG. 13A) and subsequently onto the container movement system (FIG. 13B)
Figure 13B:
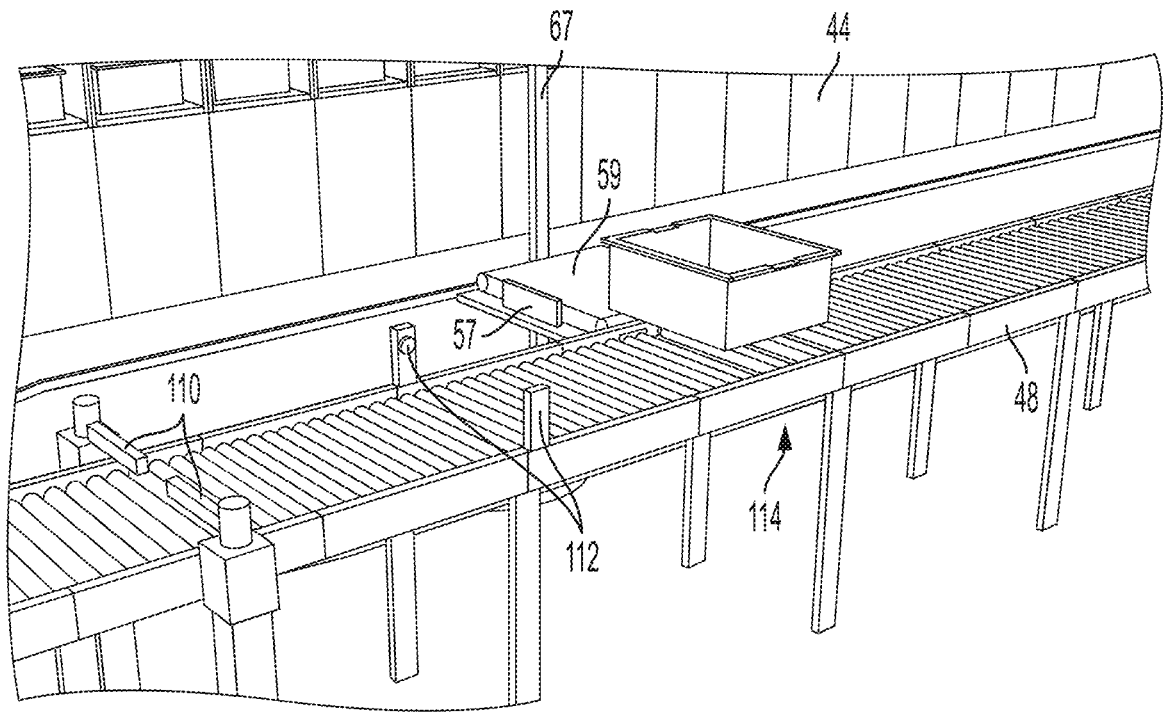
Figure 14:
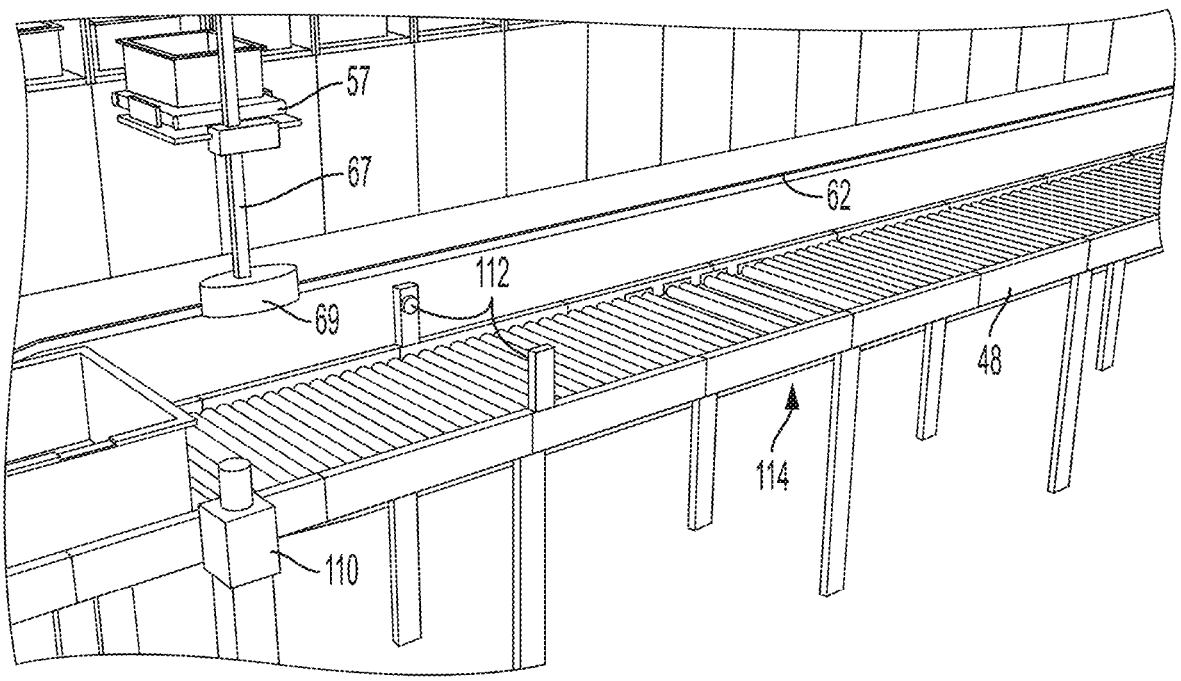
FIG. 14 shows an illustrative diagrammatic view of the empty destination container of FIGS. 13A and 13B being moved toward a container storage location.
Figure 15:
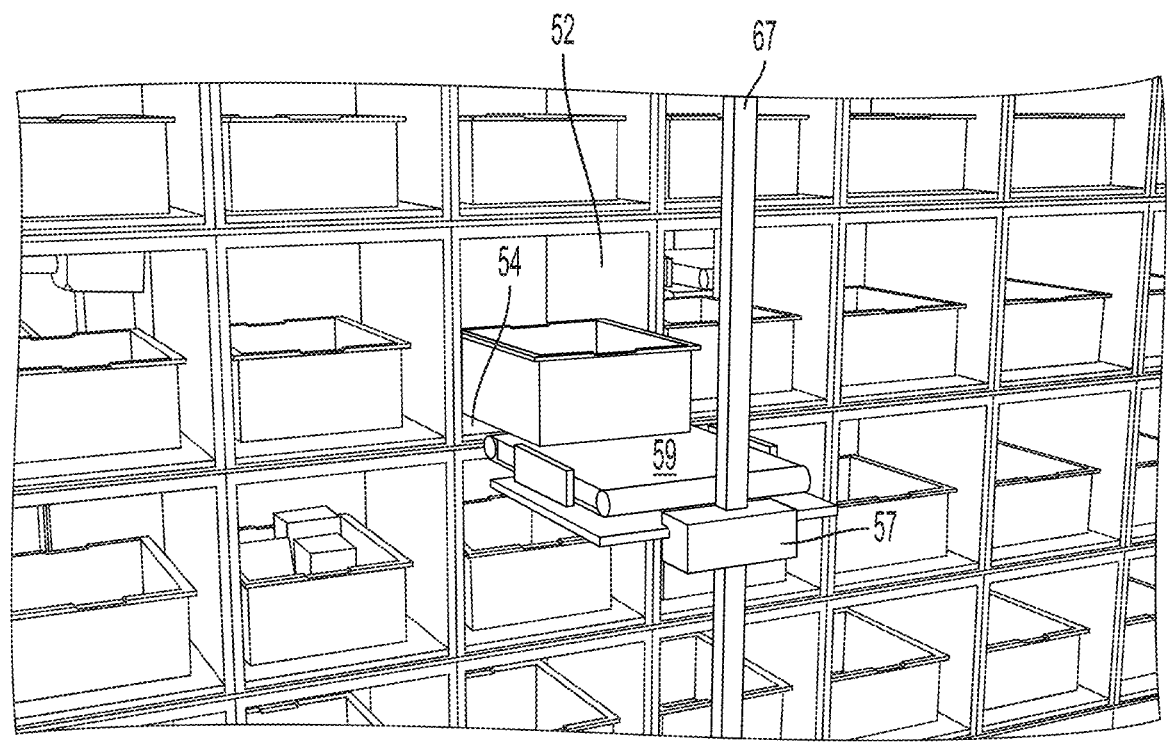
FIG. 15 shows an illustrative diagrammatic view of the empty destination container of FIG. 14 being moved into a container storage location.

Empty destination containers are replenished to the array 44 using the container movement system 58 as well. In particular, and with reference to FIG. 13A, an empty destination container is provided through gates 110, and scanned for identification by detectors 112 (FIG. 13A). The empty destination container is then moved transversely from the output conveyor 48 using a bi-direction diverter 114, and the container conveyor 59 receives the empty destination container as shown in FIG. 13B. The container movement system 38 then moves the empty destination container along the track 62 circuit (as shown in FIG. 14) and upward so that the container conveyor 59 is adjacent the container location conveyor 54 of the empty container location 52 as shown in FIG. 15. The conveyor 59 and optionally the conveyor 54 work to move the empty container into the empty destination container location 52. In this way, empty destination containers may be populated into the array 44 as needed.

Figure 16:
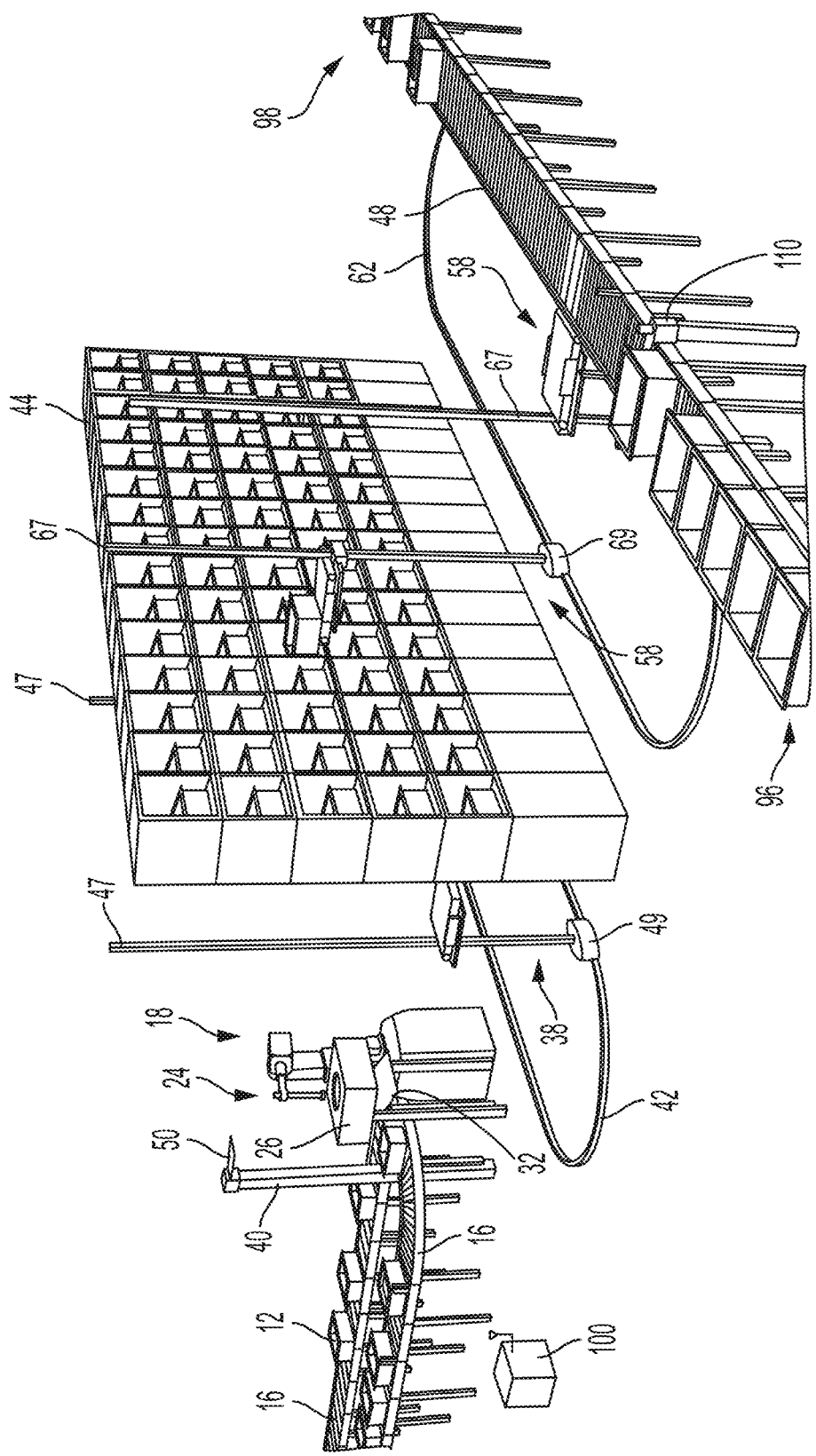
FIG. 16 shows an illustrative diagrammatic opposite side view of the system of FIG. 1.

FIG. 16 shows an opposite side view of the system of FIG. 1, showing the output conveyor 48 that includes both empty containers at a first end 96, and completed destination containers being provided at an opposite second end 98. Again, the system is controlled by one or more computer processing systems 100, and sensors on the conveyors may be used to monitor the locations of bins and containers on each of the conveyors.

Those skilled in the art will appreciate that numerous modifications and variations may be made to the above disclosed embodiments without departing from the spirit and scope of the invention as claim.

What is claimed is:

1. A storage, retrieval and processing system for processing objects, said storage, retrieval and processing system comprising:
    a plurality of bins including objects to be distributed, said plurality of bins being provided on an input conveyance system;
    a programmable motion device that includes an end effector for grasping and moving any of the objects within at least one of the plurality of bins in an input area of the input conveyance system;
    an object perception unit for providing perception data regarding a selected object that is presented to the object perception unit by the programmable motion device, the object perception unit including at least one camera; and
    a routing conveyance system including a first track-mounted shuttle for receiving the selected object, and for moving the selected object in each of horizontal and vertical directions toward a destination container provided among a plurality of destination containers in a vertically stacked array responsive to the perception data,
    wherein the first track-mounted shuttle includes a first conveyor mounted on a first frame that is vertically movable on a first elevator rod, the first elevator rod extending upward from a first shuttle base that is horizontally movable along a first track circuit adjacent the vertically stacked array.

2. The storage, retrieval and processing system as claimed in claim 1, wherein the storage, retrieval and processing system further includes a destination container removal system including a second tracked-mounted shuttle for removing completed destination containers from the vertically stacked array,
    wherein the first track-mounted shuttle and the second track-mounted shuttle are provided on opposite sides of the vertical stacked array of destination containers.

3. The storage, retrieval and processing system as claimed in claim 2, wherein the second track-mounted shuttle moves completed destination containers in each of horizontal and vertical directions away from the vertically stacked array of destination containers toward an output conveyor.

4. The storage, retrieval and processing system as claimed in claim 2, wherein the second track-mounted shuttle includes a second conveyor that is mounted on a second frame that is vertically movable on a second elevator rod.

5. The storage, retrieval and processing system as claimed in claim 4, wherein the second elevator rod extends upward from a second shuttle base that is horizontally movable along a second track circuit adjacent the vertically stacked array.

6. The storage, retrieval and processing system as claimed in claim 1, wherein the object perception unit includes a drop perception unit.

7. The storage, retrieval and processing system as claimed in claim 6, wherein the programmable motion device drops the selected object through the drop perception unit and onto first track-mounted shuttle.

8. The storage, retrieval and processing system as claimed in claim 1, wherein the programmable motion device includes an end-effector that is coupled to a vacuum source.

9. The storage, retrieval and processing system as claimed in claim 1, wherein the plurality of destination containers in the vertically stacked array are open on opposing sides thereof.

10. A storage, retrieval and processing system for processing objects, said storage, retrieval and processing system comprising:
    a plurality of bins including objects to be distributed, said plurality of bins being provided on an input conveyance system;
    a programmable motion device that includes an end effector for grasping and moving any of the objects;
    a routing conveyance system including a first track-mounted shuttle for receiving a selected object and for moving the selected object toward any destination container of a plurality of destination containers provided in a vertically stacked array; and
    a destination container removal system for removing completed destination containers, said destination container removal system including a second track-mounted shuttle for acquiring any destination container from the plurality of destination containers provided in the vertically stacked array,
    each track-mounted shuttle including a conveyor mounted on a frame that is vertically movable on an elevator rod, the elevator rod extending upward from a shuttle base that is horizontally movable along a respective track circuit adjacent the vertically stacked array, wherein the first track-mounted shuttle and the second track-mounted shuttle are provided on opposite sides of the vertically stacked array.

11. The storage, retrieval and processing system as claimed in claim 10, wherein the second track-mounted shuttle of the destination container removal system moves the destination container in each of horizontal and vertical directions away from the vertically stacked array of destination containers toward an output conveyor.

12. The storage, retrieval and processing system as claimed in claim 10, wherein the storage, retrieval and processing system includes a drop perception unit.

13. The storage, retrieval and processing system as claimed in claim 12, wherein the programmable motion device drops the selected object through the drop perception unit and onto first track-mounted shuttle.

14. The storage, retrieval and processing system as claimed in claim 10, wherein the plurality of destination containers in the vertically stacked array are open on opposing sides thereof.

15. A method of providing storage, retrieval and processing of objects, said method comprising:
- providing on an input conveyance system a plurality of bins including objects to be distributed;
- grasping and moving objects within at least one of the plurality of bins in an input area of the input conveyance system using a programmable motion device that includes an end effector for grasping and moving any of the objects within at least one of the plurality of bins in an input area of the input conveyance system;
- providing perception data regarding a selected object by an object perception unit, wherein the selected object is presented to the object perception unit by the programmable motion device, the object perception unit including at least one camera; and
- routing the selected object in each of horizontal and vertical directions on a first track-mounted shuttle as the first track-mounted shuttle moves about a first track circuit toward a destination container provided among a plurality of destination containers in a vertically stacked array responsive to the perception data,
- wherein the first track-mounted shuttle includes a first conveyor mounted on a first frame that is vertically movable on a first elevator rod, the first elevator rod extending upward from a first shuttle base that is horizontally movable along the first track circuit adjacent the vertically stacked array.

16. The method as claimed in claim 15, wherein the method further includes removing completed destination containers using a destination container removal system that includes a second track-mounted shuttle for moving completed destination containers in each of horizontal and vertical directions.

17. The method as claimed in claim 16, wherein removing the completed destination containers using the second track-mounted shuttle of the destination container removal system for moving the completed destination containers in each of removal horizontal and vertical directions includes moving the second track-mounted shuttle along a second track circuit,
- wherein the second track-mounted shuttle includes a second conveyor mounted on a second frame that is vertically movable on a second elevator rod, the second elevator rod extending upward from a second shuttle base that is horizontally movable along the second track circuit adjacent the vertically stacked array.

18. The method as claimed in claim 15, wherein the object perception unit includes a drop perception unit.

19. The method as claimed in claim 18, wherein the programmable motion device drops the selected object through the drop perception unit and onto first track-mounted shuttle.

20. The method as claimed in claim 15, wherein the plurality of destination containers in the vertically stacked array are open on opposing sides thereof.

\* \* \* \* \*